United States Patent
Brooks et al.

(10) Patent No.: US 10,827,001 B2
(45) Date of Patent: **\*Nov. 3, 2020**

(54) MANAGING CONNECTIONS FOR DATA COMMUNICATIONS

(71) Applicant: INTERNATIONAL BUSINESS MACHINES CORPORATION, Armonk, NY (US)

(72) Inventors: Michael D. Brooks, Hursley Park (GB); Alan Hollingshead, Hursley Park (GB); Julian C. Horn, Hursley Park (GB); Philip I. Wakelin, Hursley Park (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 357 days.

This patent is subject to a terminal disclaimer.

(21) Appl. No.: 15/220,494

(22) Filed: Jul. 27, 2016

(65) Prior Publication Data

US 2018/0034917 A1 Feb. 1, 2018

(51) Int. Cl.
*H04L 29/08* (2006.01)
*H04L 12/24* (2006.01)
*H04L 12/26* (2006.01)

(52) U.S. Cl.
CPC ........ *H04L 67/148* (2013.01); *H04L 41/0813* (2013.01); *H04L 41/0896* (2013.01);
(Continued)

(58) Field of Classification Search
CPC ... H04L 67/148; H04L 67/322; H04L 67/147; H04L 67/141; H04L 67/143;
(Continued)

(56) References Cited

U.S. PATENT DOCUMENTS

| 4,860,006 A | 8/1989 | Barall |
| 5,390,326 A | 2/1995 | Shah |

(Continued)

FOREIGN PATENT DOCUMENTS

| CN | 103685241 A | 3/2014 |
| EP | 1277355 B1 | 6/2016 |

OTHER PUBLICATIONS

List of IBM Patents or Patent Applictions Treated as Related; (Appendix P), Date Filed Mar. 1, 2017; 2 pages.

(Continued)

*Primary Examiner* — Lance Leonard Barry
(74) *Attorney, Agent, or Firm* — Cantor Colburn LLP; Steven Chiu

(57) ABSTRACT

A system for data communication. In one example method, a first system sends an enhanced capability exchange (CAPEX) request message to a second system. The CAPEX request message includes a request to change the number of connection pipes on an established socket-based connection between the first system and the second system. The first system receives an enhanced CAPEX response message from the second system. The CAPEX response message accepts the request to change the number of connection pipes on the established connection. The first system changes the number of connection pipes on the established connection in accordance with the accepted request.

5 Claims, 7 Drawing Sheets

(52) U.S. Cl.
CPC ............ *H04L 41/12* (2013.01); *H04L 67/147* (2013.01); H04L 43/0852 (2013.01); *H04L 43/0894* (2013.01)

(58) Field of Classification Search
CPC . H04L 41/0896; H04L 41/0813; H04L 41/12; H04L 43/0894; H04L 43/0852; H04L 65/1069; H04L 65/1089
See application file for complete search history.

(56) References Cited

U.S. PATENT DOCUMENTS

| | | | |
|---|---|---|---|
| 5,754,752 A | 5/1998 | Sheh et al. | |
| 6,370,656 B1 | 4/2002 | Olarig et al. | |
| 7,287,252 B2 | 10/2007 | Bussiere et al. | |
| 7,327,670 B2 | 2/2008 | Sprague et al. | |
| 7,373,433 B2 | 5/2008 | Vageline | |
| 7,523,197 B2 | 4/2009 | Castaneda et al. | |
| 7,751,346 B2 | 7/2010 | Park et al. | |
| 7,761,616 B2 | 7/2010 | Vageline | |
| 7,778,191 B2 | 8/2010 | Sun | |
| 7,886,295 B2 | 2/2011 | Burger et al. | |
| 7,929,418 B2 | 4/2011 | Moorthy et al. | |
| 8,031,617 B2 | 10/2011 | Mongul et al. | |
| 8,065,279 B2 | 11/2011 | Errickson et al. | |
| 8,156,219 B2 | 4/2012 | Qiu et al. | |
| 8,301,937 B2 | 10/2012 | Joy et al. | |
| 8,327,125 B2 | 12/2012 | Zhang et al. | |
| 8,335,853 B2 | 12/2012 | Bharrat | |
| 8,525,664 B2 | 9/2013 | Hadizad et al. | |
| 8,639,834 B2 | 1/2014 | Baratakke et al. | |
| 8,654,650 B1 | 2/2014 | Vermeulen et al. | |
| 8,762,546 B2 | 6/2014 | Ralph et al. | |
| 8,843,622 B1 | 9/2014 | Graham et al. | |
| 8,903,893 B2 | 12/2014 | Griffith et al. | |
| 8,963,713 B2 | 2/2015 | Dawes et al. | |
| 8,973,018 B2 | 3/2015 | Gaikwad et al. | |
| 9,009,710 B2 | 4/2015 | Xie et al. | |
| 9,071,887 B2 | 6/2015 | Yao et al. | |
| 9,137,268 B2 | 9/2015 | Yang | |
| 9,148,455 B2 | 9/2015 | Brabson et al. | |
| 9,276,979 B2 | 3/2016 | Reza | |
| 9,591,083 B1 | 3/2017 | Gumbula et al. | |
| 9,628,377 B2 | 4/2017 | Kafle et al. | |
| 9,747,183 B2 | 8/2017 | Bhattachharya et al. | |
| 9,842,013 B2 | 12/2017 | Arjun et al. | |
| 10,050,869 B2 | 8/2018 | Loveless | |
| 10,348,867 B1 | 7/2019 | Gemignani, Jr. | |
| 2004/0207957 A1 | 10/2004 | Kasajima et al. | |
| 2007/0192652 A1 | 8/2007 | Kao et al. | |
| 2008/0075048 A1 | 3/2008 | Suszko | |
| 2008/0089235 A1 | 4/2008 | Kotrla et al. | |
| 2008/0114882 A1 | 5/2008 | Christenson | |
| 2008/0250419 A1* | 10/2008 | Kasten | H04L 67/14 718/104 |
| 2008/0285436 A1 | 11/2008 | Robinson | |
| 2009/0164655 A1* | 6/2009 | Pettersson | H04L 65/4015 709/231 |
| 2010/0142366 A1 | 6/2010 | Bugenhagen | |
| 2011/0153834 A1* | 6/2011 | Bharrat | G06F 11/1482 709/227 |
| 2012/0151068 A1* | 6/2012 | Su | H04L 43/10 709/227 |
| 2012/0176986 A1 | 7/2012 | Rudland | |
| 2012/0240119 A1 | 9/2012 | Xie et al. | |
| 2013/0019025 A1* | 1/2013 | Chaturvedi | H04L 29/06517 709/231 |
| 2013/0124752 A1* | 5/2013 | Griffith | G06F 11/3006 709/235 |
| 2013/0148494 A1 | 6/2013 | Abbas et al. | |
| 2014/0068636 A1 | 3/2014 | Dupont et al. | |
| 2014/0207957 A1 | 7/2014 | Zhang et al. | |
| 2014/0289406 A1 | 9/2014 | Zollinger et al. | |
| 2014/0304415 A1* | 10/2014 | Prakash | H04L 47/70 709/226 |
| 2015/0032856 A1 | 1/2015 | Ishikawa et al. | |
| 2015/0131438 A1 | 5/2015 | Nirantar et al. | |
| 2015/0325106 A1 | 11/2015 | Dawes et al. | |
| 2015/0341450 A1* | 11/2015 | Reunamaki | H04L 67/18 705/14.58 |
| 2016/0028615 A1 | 1/2016 | Lee et al. | |
| 2016/0261504 A1 | 9/2016 | Sung et al. | |
| 2017/0223712 A1* | 8/2017 | Stephens | H04W 4/90 |
| 2017/0295080 A1 | 10/2017 | Brooks et al. | |
| 2017/0295083 A1 | 10/2017 | Brooks et al. | |
| 2017/0302556 A1 | 10/2017 | Brooks et al. | |
| 2017/0302557 A1 | 10/2017 | Brooks et al. | |
| 2018/0069761 A1* | 3/2018 | Iwami | G06F 13/00 |
| 2019/0014182 A1 | 1/2019 | Brooks et al. | |
| 2019/0014183 A1 | 1/2019 | Brooks et al. | |

OTHER PUBLICATIONS

Brooks, Michael D. et al., Pending U.S. Appl. No. 15/446,184, filed Mar. 1, 2017; Entitled: System and Method for Managing Connections for Data Communications.

List of IBM Patents or Patent Appilctions Treated as Related; (Appendix P), Date filed Jun. 8, 2018; 2 pages.

Brooks, Michael D. et al., Pending U.S. Appl. No. 16/028,454, filed Jul. 6, 2018; Entitled: System and Method for Managing Connections for Data Communications.

List of IBM Patents or Patent Applications Treated as Related; (Appendix P), Date filed Jul. 6, 2018; 2 pages.

Bernat, Vincent "Coping with the TCP Time-Wait state on busy Linux servers", downloaded Mar. 10, 2016; http://vincent.bernat.im/en/blog/2014-tcp-time-wait-state-linux.html; 19 pgs.

Disclosed Anonymously, "Avoiding TCP/IP Port Exhaustion", downloaded Mar. 10, 2016; https://msdn.microsoft.com/en-us/library/aa560610(v=bts.20).aspx; 5 pgs.

McMillan, Gordon "Socket Programming HOWTO", downloaded on Mar. 10, 2016; https://docs.python.org/3/howto/sockets.html; 8 pgs.

Disclosed Anonmymously; "Automated and Optimised Heartbeat Function for IP Connections" ip.com Prior Art Database Technical Disclosure; IP.com No. IPCOM000220090D; Publication Date: Jul. 20, 2012; 4 pgs.

Disclosed Anonymously "Optimised heartbeat function for IP connections based on partner locality", An IP.com Prior Art Database Technical Disclosure; IP.com No. IPCOM000228530D; publication Date: Jun. 17, 2013; 3 pgs.

Bolla et al.; "Seamless and transparent migration for TCP sessions"; IEEE 25th International Symposium on Personal, Indoor and Mobile Radio Communications; 2014; pp. 1469-1473.

Gerofi et al.; "Live Migration of Process Maintaining Multiple Network Connections"; IPSJ Online Transactions vol. 3; Mar. 2010; pp. 13-24.

Huan et al.; "A mechanism based on Netfilter for live TCP migration in cluster"; Ninth International Conference on Grid and Cloud Computing; 2010; pp. 218-222.

IBM "List of IBM Patents or Patent Applications Treated as Related"; Date Filed: Dec. 16, 2019, 2 pages.

* cited by examiner

MANAGING CONNECTIONS FOR DATA COMMUNICATIONS

BACKGROUND

The present disclosure relates to data communications, and, more specifically, to the management of connections for data communications in a computing system or network.

In computing systems and networks, connections may be used for the communication of data between components and devices. A connection may be regarded as a path for the communication of data between two nodes of a system or network. In some applications, a communication path may be established between two nodes as an individual communication session for the transfer of data relating to a particular process, upon completion of which the connection is terminated. For example, a connection between a client device and a server device may be established by a web browser for downloading a video file; once the video file is fully downloaded, the connection to the server is torn down. Such a communication path or connection may be considered to be short-lived. In other applications, a path may be established between two nodes for the communication of large volumes of data relating to a number of different, and sometimes unrelated, processes. For example, a connection may be established between two transaction processing systems, for the transfer to data relating to a large number of different processing tasks or transactions. Such a communication path or connection may be considered to be long-lived. Long-lived connections are established using techniques that are different from those used for establishing short-lived connections or communication sessions, and have different management requirements.

Existing techniques for establishing long-lived paths for data communications between two nodes of a computing system or network acquire a negotiated connection with a predefined number of connection pipes, with complementary sockets at each node. For example, a connection for the transfer of data from one transaction processing system node to another transaction processing system node may comprise two sockets, a primary socket and a secondary socket, at each node of the connection. Data for transfer from the transaction processing system to the other system is allocated to one of the sockets, and is transferred by serial communication across the corresponding connection pipe of the connection via the allocated, primary or secondary socket. Once such a socket-based connection has been established, the number of sockets/connection pipes available for allocation and use for data transfer is fixed. This may present a problem if demand for use of the connection changes significantly, for example, due to an increase or decrease in the volume of data for transfer between nodes across the connection. In particular, in order to increase or reduce the number of connection pipes available, in response to such a change in demand, the existing socket-based connection must be terminated and recycled, i.e., a new connection must be negotiated and established with more or fewer connection pipes, as required.

SUMMARY

According to an aspect of the present disclosure, a computer-implemented method is provided. The method is performed by a first system in communication with a second system. The method sends an enhanced capability exchange (CAPEX) request message to the second system. The enhanced CAPEX request message includes a request to change the number of connection pipes on an established socket-based connection between the first system and the second system. The method receives an enhanced CAPEX response message from the second system. The enhanced CAPEX response message accepts the request to change the number of connection pipes on the established connection. The method changes the number of connection pipes on the established connection in accordance with the accepted request.

According to another aspect of the present disclosure, a computer-implemented method is provided. The method is performed by a second system in communication with a first system. The method comprises receiving a capability exchange (CAPEX) request message from the first system. The method further comprises determining whether the CAPEX request message comprises an enhanced CAPEX request message including a request to change the number of connection pipes on an established socket-based connection between the first system and the second system. The method further comprises initiating an enhanced CAPEX messaging sequence to change the number of connection pipes on the established connection, if the CAPEX request message is an enhanced CAPEX request message.

According to yet another aspect of the present disclosure, an apparatus is provided. The apparatus comprises a first device for communicating data over at least one socket-based connection to a second device. The first device comprises a connection manager for managing connections. The connection manager is configured to send an enhanced capability exchange (CAPEX) request message to the second device. The enhanced CAPEX request message includes a request to change the number of connection pipes on an established socket-based connection between the first device and the second device. The connection manager is further configured to receive an enhanced CAPEX response message from the second device. The CAPEX response message accepts the request to change the number of connection pipes on the established connection. The connection manager is further configured to change the number of connection pipes on the established connection in accordance with the accepted request.

BRIEF DESCRIPTION OF THE DRAWINGS

Example implementations of the present disclosure will be described below with reference to the following drawings, in which.

DETAILED DESCRIPTION

Figure 1:
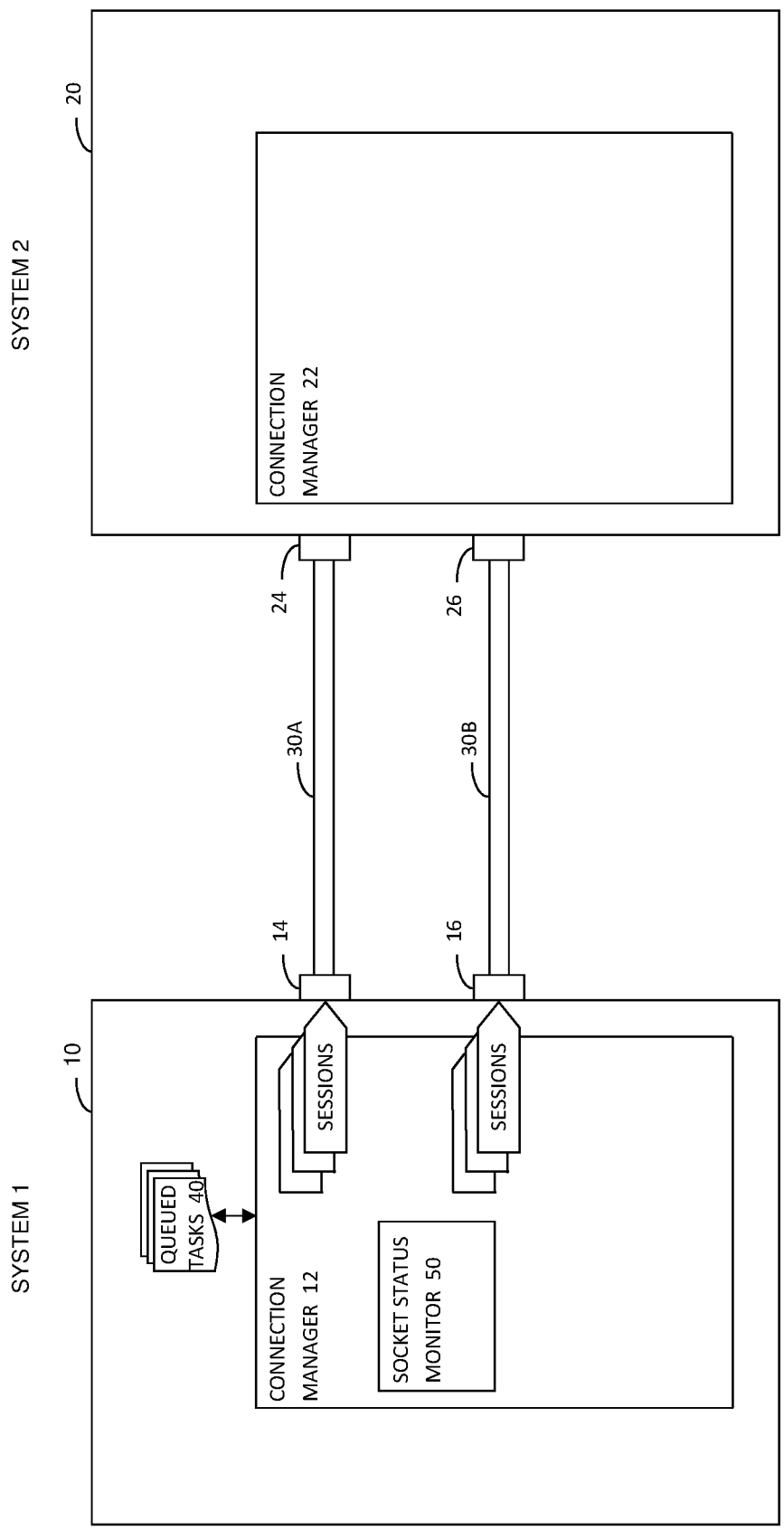
FIG. 1 is a block diagram showing connections for the communication of data from a first system to a second system.

The following description relates to the management of long-lived connections for the communication of data from a first node of a first system or device to a second node of a second system or device of a computing system or network. The described systems comprise transaction processing systems that transfer data relating to various processes, tasks and workload using standard techniques and protocols. In particular, long-lived connections are negotiated and established between the systems using a capability exchange (CAPEX) messaging sequence. As the skilled person will appreciate, the present disclosure is equally applicable to other types of devices and systems of a computing system and network that use non-transient socket-based connections, including other forms of connection that are negotiated using a CAPEX messaging sequence or the like.

Example implementations of the present disclosure relate to network nodes, each comprising a component (e.g., software, firmware and/or hardware) that permits data communications in the form of messages to be sent or received across a network connection to another node. As the skilled person will appreciate, a connection may comprise a set of connection pipes between a pair of network nodes. A connection pipe (hereinafter referred to simply as "pipe") comprises a virtual path through the network, from one node to another node, that is managed by a network controller. A network node makes use of a single socket to access a pipe in order to send messages, and for communications to and from the network controller. As the skilled person will further appreciate, a network node uses one or more sessions to permit one or more conversations to take place using a specific socket/pipe. A conversation is a set of messages and their responses that take place between the pair of nodes. A conversation can have no more than one session for a particular socket/pipe. Unless otherwise stated, terms used throughout the description should be understood in the above context. In the drawings, the same or similar features are assigned the same or similar reference numerals.

FIG. 1 shows an arrangement of connections for the communication of data from a first transaction processing system 10 ("System 1") to a second transaction processing system 20 ("System 2"). Transaction processing systems 10, 20 may comprise transaction processing servers, or monitors for transaction processing servers or regions, which perform processing of tasks and workloads, as described herein and well known to a person skilled in the art. First system 10 comprises a connection manager 12 for managing connections 30. For simplicity, FIG. 1 only shows a connection 30 from first system 10 to second system 20. As the skilled person will appreciate, connection manager 12 may manage the transfer of data over further connections 30 from first system 10 to a plurality of other systems (not shown). In the example shown in FIG. 1, first system 10 transfers data to second system 20 over a socket-based connection 30 via two sockets, a primary socket 14 and a secondary socket 16. In particular, connection manager 12 may allocate data relating to transaction processing tasks 40 (herein referred to simply as "tasks") scheduled for transfer from first system 10 to second system 20 to a session associated with either the primary socket 14 or the secondary socket 16.

Similarly, second system 20 comprises a connection manager 22 for managing connections 30. In the example shown in FIG. 1, second system 20 receives data from first system 10 over a socket-based connection 30 via two sockets, a primary socket 24 and a secondary socket 26. Thus, data is transferred from first system 10 to second system 20 over either a primary pipe 30A between primary socket 14 of system 10 and primary socket 24 of second system 20, or a secondary pipe 30B between secondary socket 16 of system 10 and secondary socket 26 of system 20. Data relating to a task 40 allocated to a session is transferred from first system 10 to second system 20 over either the primary pipe 30A or the secondary pipe 30 by serial data communication. Once a task 40, scheduled for transfer from first system 10 to second system 20, is allocated to a session, and thus for transfer of data via either the primary or secondary socket, the allocation cannot be changed for the lifetime of the task 40.

Connection manager 12 may allocate a session to new tasks 40, and may manage the scheduling of the data transfer over the corresponding connection 30. In particular, first system 10 typically processes a large number of tasks 40 in parallel. When system 10 identifies that data relating to a new task 40 should be transferred to second system 20, the first system 10 may send a request to the connection manager 12 for access to the connection 30. In response to the request, the connection manager 12 may provide a token, which allocates the new task 40 to a session. The allocated session may be associated with the primary socket 14 or the secondary socket 16 of first system 10. The token may be used by connection manager 12 for scheduling and managing data transfer across the connection 30. Once a token has been allocated, the data relating to the new task 40 may be placed in a queue of the corresponding socket 14 or 16, from which data is transferred serially across pipe 30A or 30B, respectively. Connection manager 12 comprises a socket status monitor 50 for monitoring the process for scheduling and managing data transfer from primary and secondary sockets 14 and 16 across the corresponding primary and secondary pipes 30A and 30B.

As the skilled person will appreciate, there is a time delay or latency between the connection manager 12 of the first system 10 receiving a request for allocation of a session to a new task 40 and the data relating to the new task being successfully communicated to the second system 20 over the connection 30. This time delay may dynamically change according to demand for use of the connection 30 between the first system 10 and the second system 20. In particular, at any given time, the time delay may be dependent upon the volume of other processes and tasks 40 of the first system 10 concurrently seeking access to, and use of, the connection 30. If the time delay becomes too long, performance of the first system 10 may be reduced. Conversely, if the time delay becomes too short, resources associated with the connection 30 may be underutilized. In either case, the efficiency of the first system 10 may be compromised.

Figure 2:
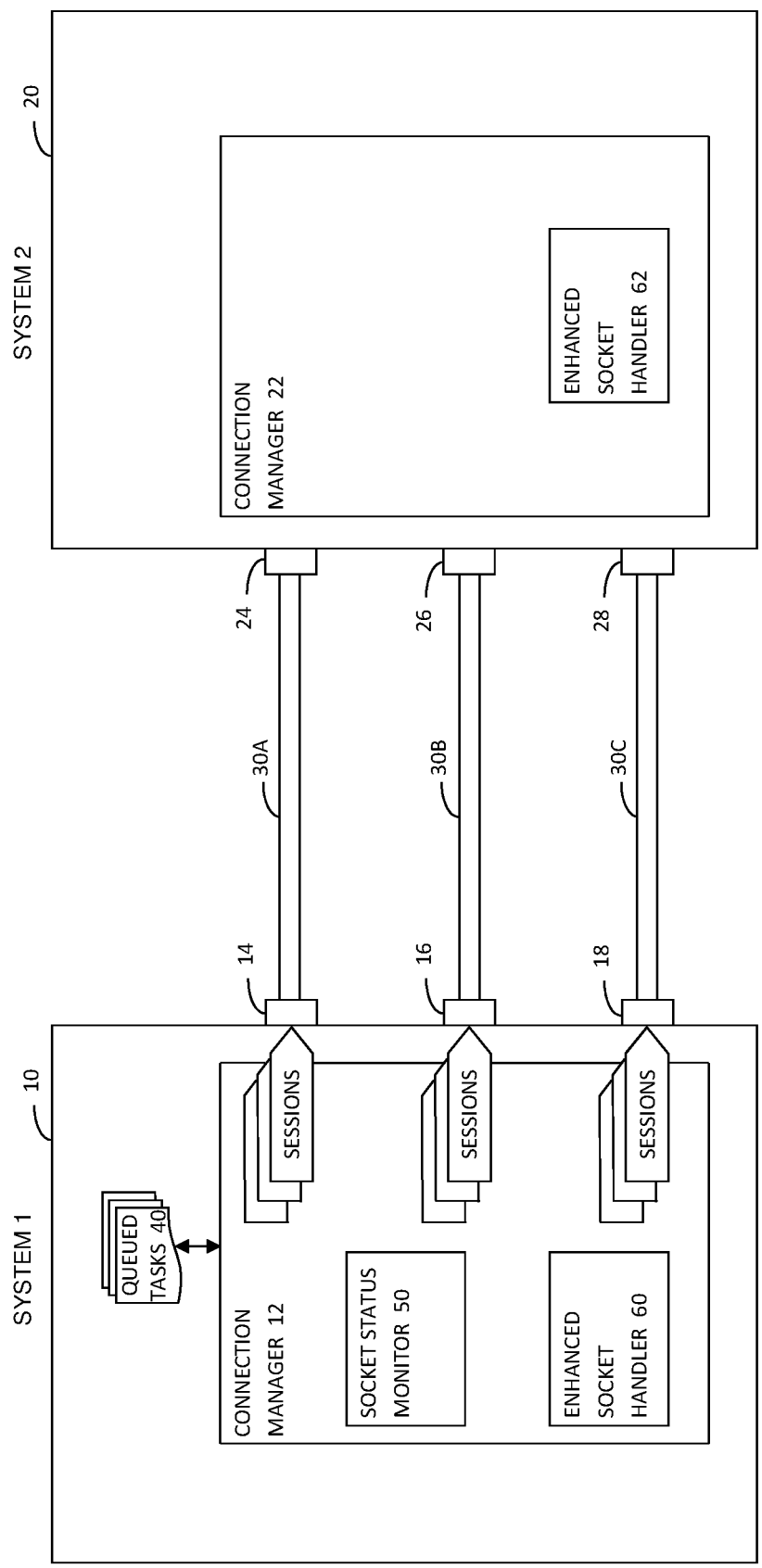
FIG. 2 is a block diagram similar to FIG. 1, showing connections for the communication of data from a first system to a second system according to an example implementation of the present disclosure.

FIG. 2 shows an arrangement of connections for the communication of data from a first transaction processing system 10 ("System 1") to a second transaction processing system 20 ("System 2") according to an example implementation of the present disclosure. The first and second systems 10 and 20, and connection 30 comprising primary and secondary pipes 30A and 30B, are equivalent to those of FIG. 1, and so will not be described in detail. However, in accordance with the illustrated example implementation of the present disclosure, connection manager 12 of the first system 10 comprises an enhanced socket handler 60 in addition to a socket status monitor 50. Similarly, connection manager 22 of the second system comprises an enhanced socket handler 62, which may be in addition to a socket status monitor (not shown). As shown in FIG. 2, connection manager 12 of first system 12 uses enhanced socket handler 60 to establish a third socket 18 and connection manager 22 of second system 20 uses enhanced socket handler 62 to establish a third socket 28. Thus, a third pipe 30C, between the third sockets 18 and 28 of the first and second systems 10, 20, is added to the existing connection 30, comprising primary and secondary pipes 30A and 30B, for the transfer of data from the first system 10 to the second system 20. Example methods for establishing (i.e., opening) and closing the third pipe 30C and associated sockets 18 and 28 of connection 30 are described below with reference to FIGS. 3, 4, 5 and 6.

Figure 3:
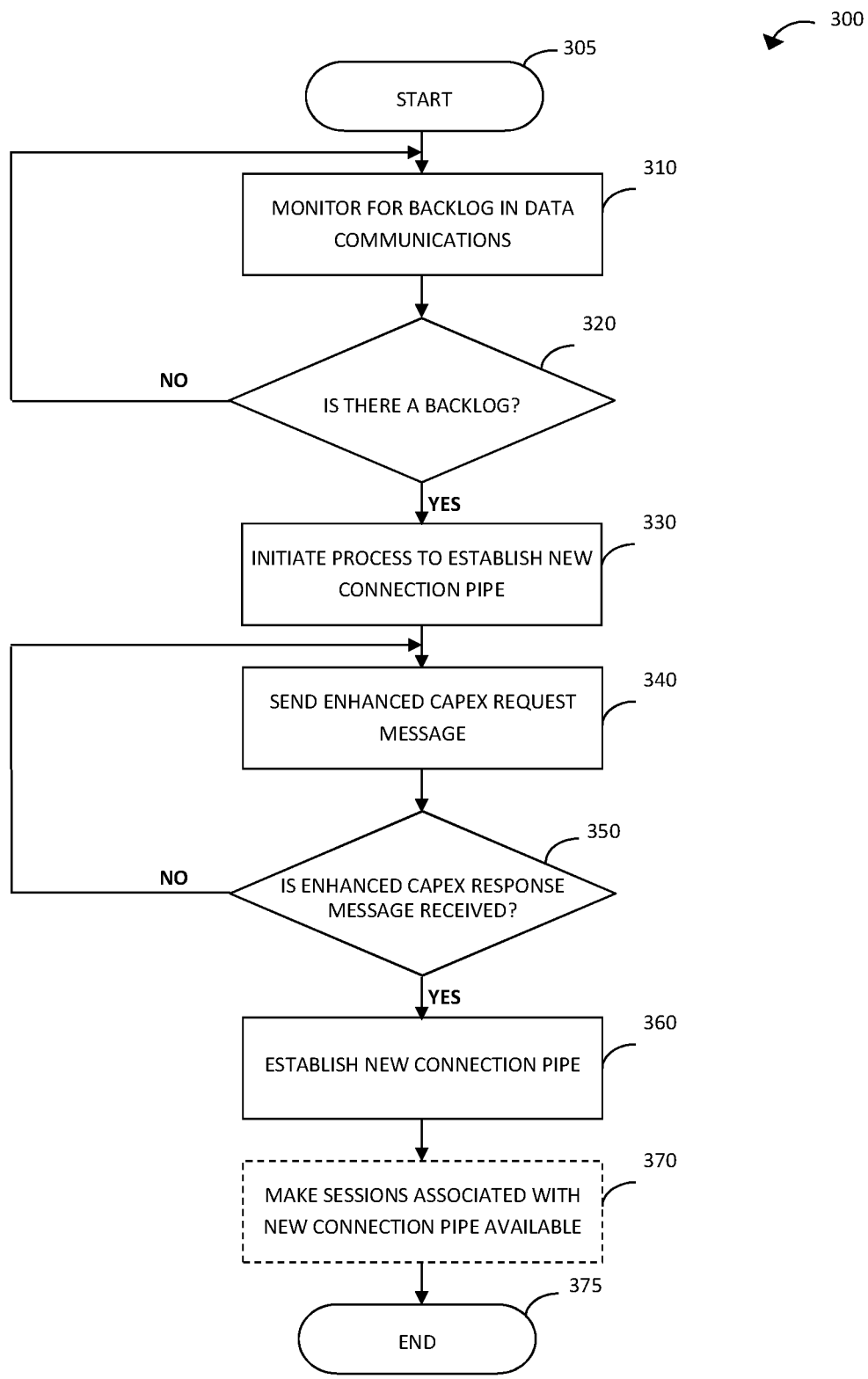
FIG. 3 is a flow diagram illustrating a method for managing connections according to an example implementation of the present disclosure.

FIG. 3 is a flowchart illustrating a method 300 for managing connections in accordance with an example implementation of the present disclosure. In particular, although not exclusively, the method 300 may be performed by the socket status monitor 50 and the enhanced socket handler 60 of the connection manager 12 of the first system 10 of FIG. 2.

The method 300 starts at step 305. At step 310, the method monitors a demand for communication of data over a connection to another system. Various techniques may be used for monitoring demand, according to application requirements. For example, step 310 may monitor the volume of data in a queue, such as a queue of data awaiting a token for allocation to a session associated with a socket/pipe of the connection or a queue of data awaiting transfer at a socket. Alternatively, step 310 may monitor the time taken between a request for communication of data over the connection and the second successful communication of that data, or the time period that data is waiting a queue for transfer over the connection. Still further, step 310 may monitor the rate of change (i.e., increase or decrease) of a volume of data in a queue for transfer over the connection. Other techniques for monitoring demand are possible and contemplated by the present disclosure.

At step 320, the method determines whether the demand indicates a backlog of data for communication over the connection. For example, step 320 may compare a monitored volume of data in a queue with a threshold data volume indicative of a backlog, and determine that there is a backlog if the threshold is exceeded. Alternatively, step 320 may compare a monitored time delay (e.g., a time period between a request for communication of data over the connection and the successful communication of that data or a time period that data is waiting in a queue for transfer over the connection) with a threshold time delay indicative of a backlog, and determine that there is a backlog if the threshold is exceeded. Still further, step 320 may compare a rate of increase in volume of data in a queue for transfer over the connection with a threshold rate indicative of a backlog. If step 320 determines that there is no backlog, the method returns to step 310 and continues to monitor demand. However, if step 320 determines that there is a backlog, then a new connection pipe on the connection is required to provide additional capacity for the transfer of data over the connection to the other system, and the method proceeds to step 330.

At step 330, in response to determining that a new pipe on the existing connection is required, the method initiates a process to establish the new pipe. For example, processing may be transferred to another component for enhanced socket handling, and in particular for handling the establishment of the new pipe. In example implementations of the present disclosure, steps 310 to 330 of the method 300 may be performed by the socket status monitor 50 of the connection manager 12 of the first system 10 of FIG. 2, and processing may be transferred to the enhanced socket handler 60 for the subsequent steps of the method 300, as described below.

At step 340, the method sends an enhanced capability exchange (CAPEX) request message of a CAPEX messaging sequence, for establishing a new pipe of a connection, to the other system. The structure of the enhanced CAPEX request message may be equivalent to the structure of a conventional CAPEX request message for establishing a new connection, but enhanced (e.g., extended) to include an additional field, flag or other indicator, to indicate that it is intended for enhanced socket handling, and, in particular, it is a request for a new pipe on an existing connection. The enhanced CAPEX request message may be sent using conventional techniques. For example, a new socket may be opened and the message sent via the new socket creating a (temporary) pipe to the other system, which, in turn, opens a complementary new socket to receive the message. The message may be received by a corresponding component of the other system for handling the CAPEX messaging sequence for establishing a new pipe. Further details of the processing performed in the other system is described below in relation to FIG. 5.

At step 350, the method determines whether an enhanced CAPEX response message has been received, accepting the request to establish a new connection pipe over the existing connection. If step 350 determines that a CAPEX response message is not received, the method returns to step 340, which may resend the enhanced CAPEX request message. Alternatively, if step 350 determines that a CAPEX response message is received from the other system, the method proceeds to step 360, which creates a new (permanent) pipe of the existing connection in accordance with the accepted request.

At optional step 370, the method makes sessions available to service data communication over the connection using the new pipe. For example, data related to the backlog of tasks may be allocated initially to new sessions associated with the new socket/pipe, and, once the backlog is clear, data may be allocated evenly across all sessions associated with all socket/pipes of the connection. As the skilled person will appreciate, step 370 may be omitted from the method 300 and performed in separate process. The method then ends at step 375.

As the skilled person will appreciate, various modifications may be made to the method 300 of FIG. 3. For example, steps 310 and 320 may be performed by another process, and the method may start at step 330 in response to determining that a new pipe on an existing connection is required. In addition, the monitoring in steps 310 and 320 may be performed continuously or periodically, according to application requirements.

Moreover, the threshold used by step 320 to determine whether or not there is a backlog of data to be communicated over a connection may be predefined by the system vendor, for instance based on performance requirements for the system, and/or may be defined or modified by the consumer, as desired. In example implementations of the present disclosure, the threshold may be based on a percentage change in demand, such as an increase in demand of X % compared to an average of previous or normal demand. In this case, step 320 may determine an increase in demand and compare the increase in demand with the threshold percentage change to determine whether there is a backlog. Other suitable thresholding techniques are possible and contemplated by the present disclosure.

Figure 4:
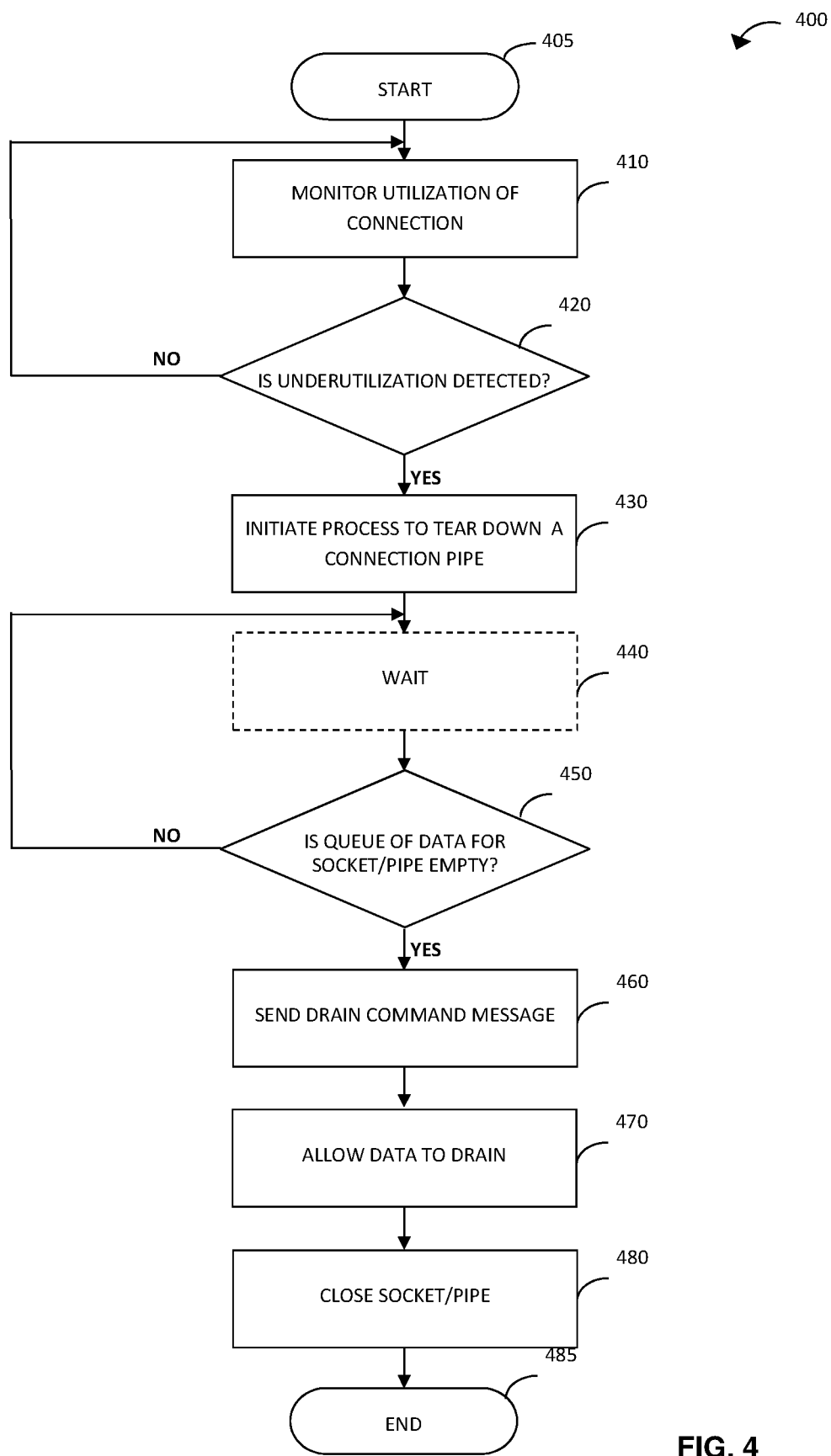
FIG. 4 is a flow diagram illustrating another method for managing connections according to an example implementation of the present disclosure.

FIG. 4 is a flowchart illustrating a method 400 for managing connections in accordance with an example implementation of the present disclosure. In particular, although not exclusively, the method 400 may be performed by the socket status monitor 50 and the enhanced socket handler 60 of the connection manager 12 of the first system 10 of FIG. 2.

The method 400 starts at step 405. In example implementations of the present disclosure, the method may start in response to a new connection pipe being established for an existing connection to another system, for example using the method described above with reference to FIG. 3. At step 410, the method monitors utilization of the connection, for example by monitoring demand for communication of data over the connection comprising the added pipe. Various techniques may be used for monitoring demand, according to application requirements. For example, step 410 may monitor the volume of data in a queue, such as a queue of a socket of the connection. Alternatively, step 410 may monitor the time period between a request for communication of data over the connection and the successful communication of that data or a time period that data is waiting in a queue for transfer over the connection. Still further, step 410 may monitor a rate of change (i.e., increase or decrease) in volume of data in a queue for transfer over the connection. Other techniques for monitoring utilization/demand are possible and contemplated by the present disclosure.

At step 420, the method determines whether underutilization of the connection is detected. For example, step 420 may compare a monitored volume of data in a queue with a minimum threshold data volume indicative of underutilization, and determine that underutilization is detected if the monitored volume of data in the queue is less that the minimum threshold. Alternatively, step 420 may compare a monitored time delay (e.g., a time period between a request for communication of data over the connection and the successful communication of that data or a time period that data is waiting in a queue for transfer over the connection) with a threshold time delay indicative of a minimum expected time delay, and determine that underutilization is detected if the monitored time taken is below the threshold. Still further, step 420 may compare a rate of decrease in volume of data in a queue for transfer over the connection with a threshold rate indicative of underutilization.

If step 420 determines that underutilization is not detected, the method returns to step 410 and continues to monitor utilization of the connection. However, if step 420 determines that underutilization of the connection is detected, then capacity for the transfer of data over the connection to the other system should be reduced by tearing down a pipe, and the method proceeds to step 430.

At step 430, in response to determining a requirement to tear down a pipe, the method initiates a process to close a connection pipe of the connection. For example, processing may be transferred to another component for enhanced socket handling, and in particular for closing a previously added socket and corresponding pipe. In example implementations of the present disclosure, steps 410 and 420 of method 400 may be performed by the socket status monitor 50 of the connection manager 12 of the first system 10 of FIG. 2, and processing may be transferred to the enhanced socket handler 60 for the subsequent steps of the method 400, as described below.

Following step 430, the method may then wait at optional step 440. For instance, step 440 of the method may wait a time period to allow for any data queued for transfer via the socket/pipe being closed to be drained (i.e., successfully communicated over the connection). As the skilled person will appreciate, the waiting time period at step 440 may be predetermined or may be determined dynamically based on the volume of data in the queue for the corresponding socket/pipe.

At step 450, the method determines whether the queue of data for the socket/pipe being closed is empty and/or has remained empty for a predefined time period. If step 450 determines that the data queue is not empty and/or has not remained empty for a predefined time period, the method returns to step 440 and may wait for a further time period. Alternatively, if step 450 determines that the data queue is empty, the method proceeds to step 460.

At step 460, the method sends a command message, for closing a socket and tearing down an associated pipe of a connection, to the other system. In example implementations, the command message may comprise a conventional drain command message that is enhanced to indicate that it is a request to tear down a previously added pipe of the connection. In other example implementations, the command message may be a new type of command message indicating that it is a request to tear down an individual pipe. The command message may be sent to the other system over the pipe to be torn down and received by a corresponding component for draining and closing the corresponding socket. Further details of the processing performed in the other system is described below in relation to FIG. 5.

At step 470, the method allows the queue of data associated with the socket of the other system to be drained and/or the socket of the other system to be closed, for example by monitoring data received over the pipe. Once the queue of data for the socket of the other system is empty, which may be detected, for example, by silence (i.e., absence of data) on the pipe for predefined time period or otherwise, the method proceeds to step 480, which closes the corresponding socket of the connection. As the skilled person will appreciate, closing the complementary sockets associated with a pipe tears down the pipe. The method then ends at step 485.

As the skilled person will appreciate, various modifications may be made to the method 400 of FIG. 4. For example, steps 410 and 420 may be performed by another process, and the method may start at step 430 in response to determining that a pipe should be torn down. The steps of the method 400 of FIG. 4 may be performed in any suitable order. For example, in other example implementations of the present disclosure, the order of steps 440 and 450 may be reversed or step 440 may be omitted entirely. In other example implementations, steps 460 and 470, which drain the queue of data associated with the other system, may be performed before or concurrently with steps 440 and 450. The threshold used by step 420 to determine whether or not there is underutilization of a connection may be predefined by the system vendor, for instance based on performance requirements for the system, and/or may be defined or modified by the consumer, as desired. In example implementations of the present disclosure, the threshold may be based on a percentage change in demand, such as a decrease in demand of X % compared to an average of previous or normal demand. In this case, step 420 may determine a decrease in demand and compare the decrease in demand with the threshold percentage change to determine whether there is underutilization of the connection. Other suitable thresholding techniques are possible and contemplated by the present disclosure.

Whilst the above description of the method 400 of FIG. 4 relates to a connection for data communication having previously-added pipes, the method equally may be used in conjunction with connections that are established at the outset with multiple pipes, by default. In addition, any pipe of a connection may be selected to be torn down. In the described example implementation, the command message is sent over the pipe selected to be torn down, thereby avoiding the need to identify the pipe in the command message.

In accordance with example implementations of the present disclosure, the methods of FIGS. 3 and 4 may be performed concurrently in a single component or multiple components, such as the socket status monitor 50 and the enhanced socket handler 60 of the connection manager 12 of the first system 10 of FIG. 2. It will be appreciated that, in other methods in accordance with example implementations of the present disclosure, the techniques of the methods of FIGS. 3 and 4 may be combined into an integrated process. In addition, the method 300 of FIG. 3 may be used to establish more than one pipe, in order to meet an increase in demand. Conversely, the method 400 of FIG. 4 may be used to tear down more than one pipe, by sending a command message over each of the pipes, in order to optimize the connection to meet a reduction in demand.

Figure 5:
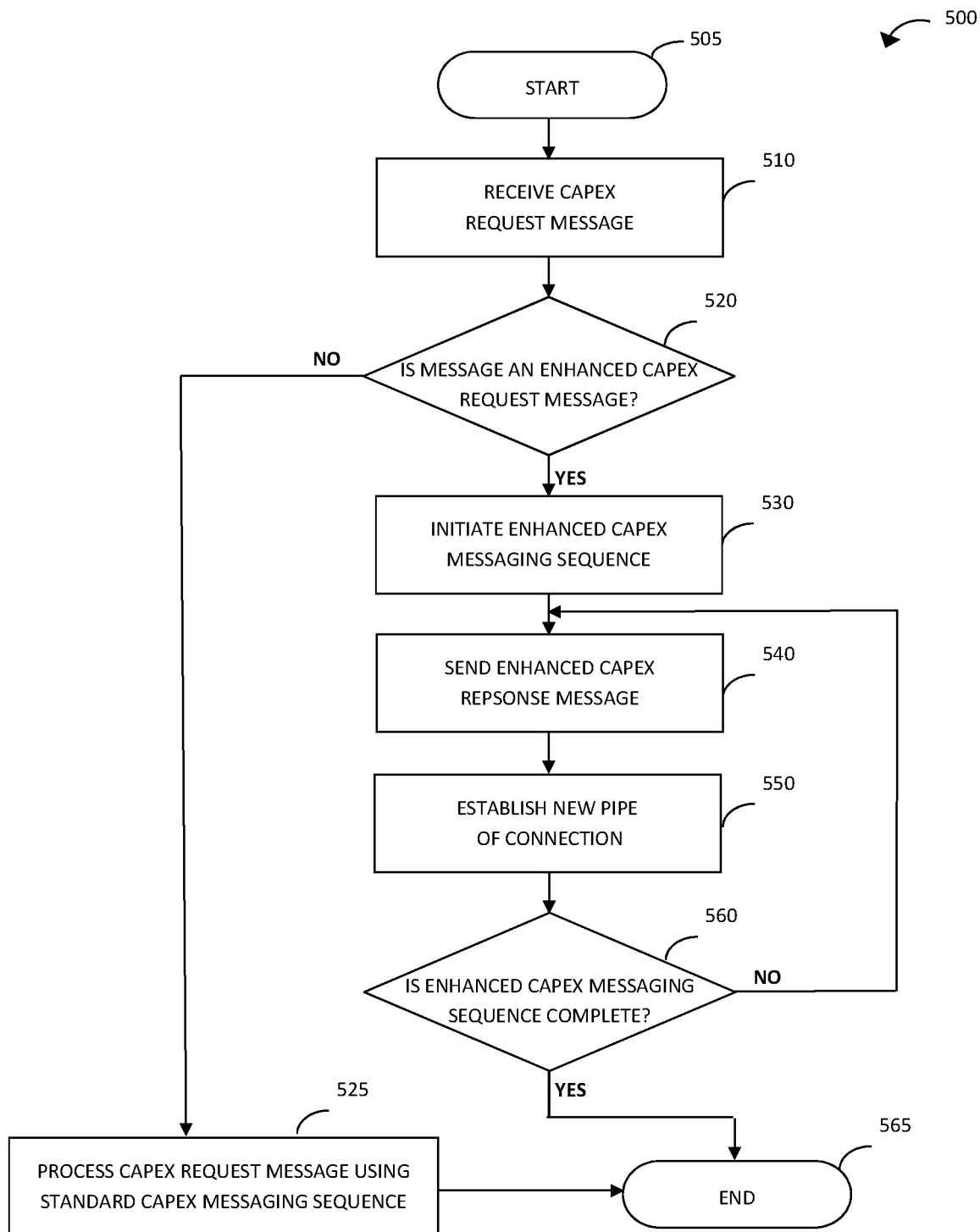
FIG. 5 is a flow diagram illustrating yet another method for managing connections according to an example implementation of the present disclosure.

FIG. 5 is a flowchart illustrating a method 500 for managing connections in accordance with an example implementation of the present disclosure. In particular, although not exclusively, the method 500 may be performed by the connection manager 22, including the enhanced socket handler 62, of the second system 20 of FIG. 2. As will be apparent from the following description, the method 500 may be performed in conjunction with the method 300 of FIG. 3 and/or the method 400 of FIG. 4.

The method starts at step 505. At step 510, the method receives a capability exchange (CAPEX) request message from another system over a connection. In accordance with example implementations of the present disclosure, the method may receive an enhanced CAPEX request message for enhanced socket handling. For example, the enhanced CAPEX request message may comprise a request to establish a new pipe, for example as sent by step 340 of the method of FIG. 3. Alternatively, the method may receive a standard CAPEX request message to establish a socket-based connection.

At step 520, the method determines whether the received message is an enhanced CAPEX request message. For example, step 520 may examine the structure of the received message for an additional field, flag or other indicator, which indicates that it is a request for enhanced socket handling. If step 520 determines that the message is not an enhanced CAPEX message, then the method proceeds to step 525. At step 525, the method processes the CAPEX request message using a standard CAPEX messaging sequence, and then ends at step 565. However, if step 520 determines that the message is an enhanced CAPEX request message, for example due to the presence of an additional field, flag or other indicator, which requires enhanced socket handling, the method proceeds to step 530.

At step 530, the method initiates an enhanced CAPEX messaging sequence. For example, processing may be passed to another component for enhanced socket handling. In example implementations of the present disclosure, steps 510 and 520 may be performed by the connection manager 22 of the second system 20 of FIG. 2, and processing may be transferred to the enhanced socket handler 62 for the subsequent steps of the method 500, as described below.

At step 540, the method sends an enhanced CAPEX response message to the other system, accepting the enhanced CAPEX request. In particular, the structure of the enhanced CAPEX response message may be equivalent to the structure of a conventional CAPEX response message, but enhanced (e.g., extended) to include an additional field, flag or other indicator, to indicate agreement to comply with the enhanced CAPEX request. The enhanced CAPEX response message may be sent over the (temporary) pipe to the other system, and received by a corresponding enhanced socket handling component, for example as in step 350 of the method of FIG. 3.

At step 550, the method completes the enhanced CAPEX messaging sequence to establish the new (permanent) pipe on the connection, in accordance with the negotiated capabilities of the enhanced CAPEX messaging sequence.

At step 560, the method determines whether the enhanced CAPEX messaging sequence is complete. If step 560 determines that the enhanced CAPEX messaging sequence is not complete, for example, due to an error, the method returns to step 540. In this case, the method may repeat steps 540 through 560 until the enhanced CAPEX messaging sequence is complete. However, if step 560 determines that the enhanced CAPEX messaging sequence is complete, the method ends at step 565.

As the skilled person will appreciate, various modifications may be made to the method 500 of FIG. 5. For example, steps 540 to 560 may be performed in any suitable order, consistent with CAPEX messaging sequence and protocol requirements, for a particular application. Thus, in other example implementations of the present disclosure, step 540 of sending an enhanced CAPEX response message may be performed immediately after step 550 of determining whether the CAPEX request message is an enhanced CAPEX request message to establish a new pipe, or immediately before step 560 of determining whether the enhanced CAPEX messaging sequence is complete. In addition, different steps of the method 500 of FIG. 5 may be performed by separate components. For example, steps 510, 520, 525 and 530 may be performed by one component, such as the connection manager 12 or 22 of respective first and second systems 10 and 20 of FIG. 2, and steps 540 to 580 may be performed by another component, such as the enhanced socket handler 60 or 62 of respective first and second systems 10 and 20 of FIG. 2. In this case, the connection manager 12 or 22 may determine whether the received CAPEX request message is a standard CAPEX request message in step 520, and proceed to step 525 if the received message is a standard CAPEX request message. Otherwise, the connection manager 12 or 22 may pass the processing to the enhanced socket handler 60 or 62 to handle the received CAPEX request message in steps 540 to 560.

Figure 6:
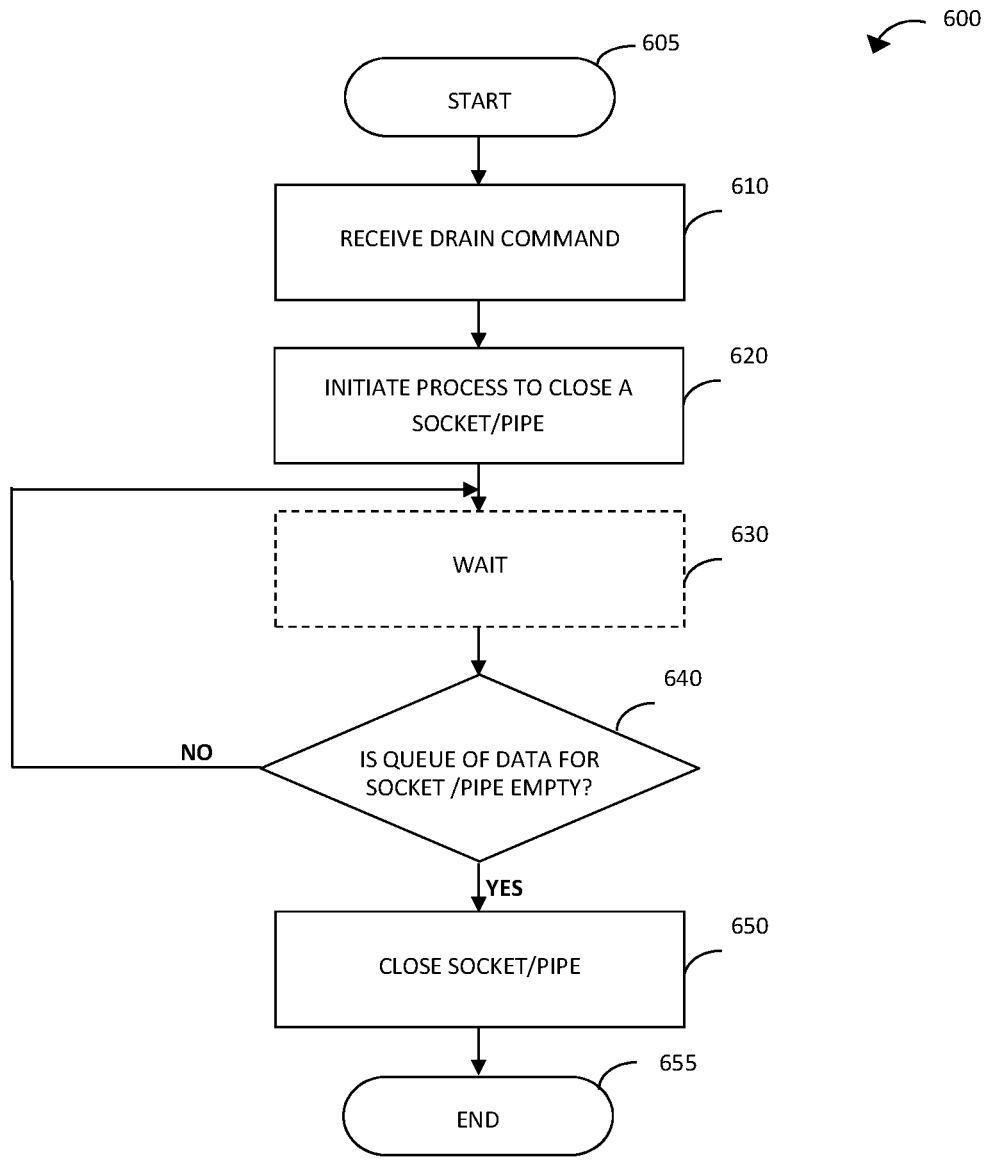
FIG. 6 is a flow diagram illustrating still a further method for managing connections according to an example implementation of the present disclosure.

FIG. 6 is a flowchart illustrating a method 600 for managing connections in accordance with an example implementation of the present disclosure. In particular, although not exclusively, the method 600 may be performed by the connection manager 22, including the enhanced socket handler 62, of the second system 20 of FIG. 2. As will be apparent from the following description, the method 600 may be performed in conjunction with the method 300 of FIG. 3 and/or the method 400 of FIG. 4 and/or the method 500 of FIG. 5.

The method starts at step 605. At step 610, the method receives a command message from another system over a pipe of a socket-based connection. In accordance with example implementations of the present disclosure, the command message may be received over a previously added pipe of a socket-based connection or another pipe to be torn-down. The command message may comprise a command for tearing down the pipe, including a request to drain a queue associated with the corresponding socket/pipe and to subsequently close the socket. In example implementations of the present disclosure, the command message may be sent by step 460 of the method 400 of FIG. 4.

At step 620, the method initiates a process to close the socket/pipe. Following step 620, the method may then wait at optional step 630. For instance, step 630 of the method may wait a time period to allow for any data queued for transfer over the socket/pipe being closed to be drained (i.e., successfully communicated over the connection). As the skilled person will appreciate, the waiting time period at step 630 may be predefined or may be determined dynamically based on the volume of data in the queue for the corresponding socket/pipe.

At step 640, the method determines whether the queue of data for socket/pipe being closed is empty and/or has remained empty for a predefined time period. If step 640 determines that the data queue is not empty, the method returns to step 630 and may wait for a further time period. Alternatively, if step 640 determines that the data queue is empty, the method proceeds to step 650 by closing the corresponding socket of the connection. As the skilled person will appreciate, closing the complementary sockets (e.g., step 650 of the method 600 of FIG. 6 in combination with step 480 of the method 400 of FIG. 4) tears down the pipe. The method then ends at step 655.

Figure 7A:
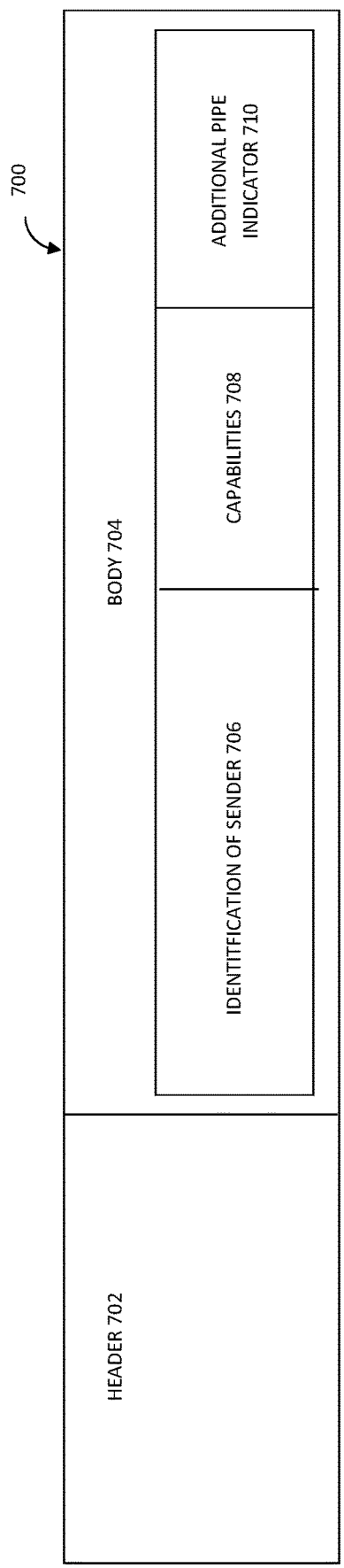
FIG. 7A is a schematic diagram of an enhanced CAPEX request message.
Figure 7B:
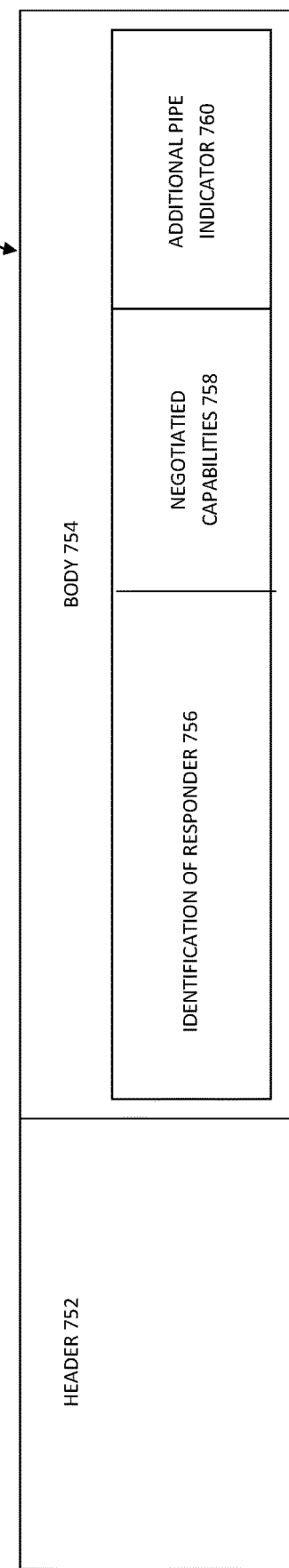
FIG. 7B is a schematic diagram of an enhanced CAPEX response message according to an example implementation of the present disclosure.

FIG. 7A is a schematic diagram showing the structure of an enhanced CAPEX request message 700 and FIG. 7B is a schematic diagram showing the structure of an enhanced CAPEX response message 750 in accordance with an example implementation of the present disclosure. In particular, the enhanced CAPEX request message includes a header 702 and a body 704, and the enhanced CAPEX response message includes a header 752 and a body 754. The header 702, 752 and body 704, 754 of the enhanced CAPEX request/response message 700, 752 may be of fixed or variable length, and may be consistent with the structure of standard CAPEX request/response messages. The header 702, 752 of the enhanced CAPEX request/response message 700, 750 includes conventional header data, for example identifying the type of message and routing information, which may be consistent with standard CAPEX request/response messages. The body 704, 754 of the enhanced CAPEX request/response message 700, 752 includes a plurality of fields, including an identification field 706, 756 and a capabilities field 708, 758, which may be consistent with standard CAPEX request/response messages. In particular, the body 704 of enhanced CAPEX request message 700 includes an identification field 706 comprising data identifying the sender of the request and a capabilities field 708 comprising data relating to the capabilities of the sender. Similarly, the body 754 of enhanced CAPEX response message 750 includes an identification field 756 comprising data identifying the responder sending the response and a capabilities field 708 comprising data relating to the negotiated capabilities based on the capabilities of the sender and the responder.

In addition, in accordance with the illustrated example implementation of the present disclosure, the body 704, 754 of the enhanced CAPEX request/response message 700, 752 includes an additional field, which is not present in the standard CAPEX request/response message 700, 752. In particular, as described previously, body 704 of the CAPEX request message 700 includes an additional pipe indicator field 710 comprising data indicating that the request is to add a further pipe to an existing connection. Similarly, body 754 of the CAPEX response message 750 includes an additional pipe indicator field 760 comprising data indicating the response it accepting the request to add a further pipe to the existing connection.

Whilst the present disclosure relates to systems, in particular, comprising transaction processing systems comprising servers and/or associated monitors, the techniques described herein may be used in conjunction with any other suitable type of device of a computing system or network. Moreover, the present disclosure uses the terms "first system" and "second system", with reference to FIG. 2, for the convenience of description only. As the skilled person will appreciate, the above-described arrangement and function of the first and second systems 10, 20, and, in particular, the connection manager and enhanced socket handler thereof are typically present and required in both the first and second systems. Thus, the connection manager 22, enhanced socket handler 62 and a socket status monitor (not shown) of the second system 20 may perform methods in accordance with the example implementations of FIGS. 3 and 4, and the connection manager 12 and the enhanced socket handler 60 of the first system 10 may perform a method in accordance with the example implementations of FIGS. 5 and 6.

In summary, the present disclosure provides additional components having functionality for enhanced socket handling. In particular, the functionality may be provided as software, firmware and/or hardware, and may be provided as an upgrade to legacy systems and devices or integrated within new systems and devices. The functionality may be provided in an enhanced socket handler component, associated with a connection manager, of each system or device, as in the described example implementations. The functionality performed by the enhanced socket handler may include accepting requests from a local processing region associated with a first system to establish one or more new sockets to communicate over a previously established connection with a partner processing region associated with a second system. The functionality may further include notifying the partner region associated with the second system that additional connection pipes are needed. The functionality may further include recognizing when a partner region associated with another system is asking for additional connection pipes to be established, and differentiating between attempts to acquire a connection that is already open, which would otherwise be rejected. The functionality may also include recognizing a request to increase the number of connection pipes for an existing socket-based connection and building the necessary infrastructure to allow the local system to process data received over each new pipe. In relation to transaction processing systems, in particular, the functionality may further include building the necessary infrastructure to allow a local region associated with a system to process concurrent requests over new and existing pipes. In addition, the functionality may further include managing the distribution of tasks and workloads of data received across the extended set of pipes that make up the connection.

In contrast to many uses of a TCP/IP network, which involve multiple client connections to a server region, the present disclosure is advantageous in relation to long-lived, peer to peer connections that support the use of multiple pipes that make up a single connection. However, other applications that might benefit from the teachings of the present disclosure are possible and contemplated.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. An apparatus comprising:
a first device for communicating data over at least one socket-based connection, the first device comprising a connection manager configured to:
send a second capability exchange request message to a second device, wherein the second capability exchange request message requests a change to a number of connection pipes on an established socket-based connection between the first device and the second device, wherein a format of the second capability exchange request message includes an additional field, flag or other indicator as compared to a first capability exchange request message as sent by the first device, wherein the additional field, flag or other indicator of the second capability exchange request message indicates a request by the first device for enhanced socket handling;
receive a second capability exchange response message from the second device, wherein the second capability exchange response message accepts the request to change the number of connection pipes on the established connection, wherein a format of the second capability exchange response message includes an additional field, flag or other indicator as compared to a first capability exchange response message as sent from the second device, wherein the additional field, flag or other indicator of the second capability exchange response message indicates an agreement by the second device to comply with an enhanced socket handling request; and
change the number of connection pipes on the established connection in accordance with the accepted request to create a new connection pipe of the at least one socket-based connection, wherein the new connection pipe transfers data in a queue;
monitor a volume of data in the queue;
compare a monitored volume of the data in the queue with a minimum threshold data volume indicative of under-utilization; and
tear down the new connection pipe in response to the monitored volume of data in the queue being less than the minimum threshold.

2. The apparatus of claim 1, wherein the connection manager of the first device is further configured to:
determine a demand for use of the established connection for a transfer of data from the first device to the second device;
compare the demand with a predetermined threshold; and
identify a requirement to change a capacity of the established connection, based on a determination that the demand exceeds the predetermined threshold.

3. The apparatus of claim 2, wherein the connection manager of the first device is configured to determine the demand by at least one of:
determining a volume of data in the queue of data for transfer from a first system to a second system over the established connection;
determining a time delay between an identification of a requirement for the transfer of data from the first system to the second system over the established connection and the transfer of the data;
determining a time period that data is waiting in a queue for transfer over the established connection; and
determining a rate of increase in volume of data in a queue for transfer over the established connection.

4. The apparatus of claim 1, wherein the connection manager of the first device is further configured to:
determine a demand for use of the established connection for a transfer of data from the first device to the second device;
compare the demand with an upper predetermined threshold and a lower predetermined threshold;
identify a requirement to increase the number of connection pipes on the established connection, based on a determination that the demand is greater than the upper predetermined threshold; and
identify a requirement to reduce the number of connection pipes on the established connection, based on a determination that the demand is less than the lower predetermined threshold.

5. The apparatus of claim 4, wherein the connection manager of the first device is further configured to:
send the second capability exchange request message to the second device in response to identifying the requirement to increase the number of connection pipes on the established connection; and
send a command message in response to identifying the requirement to reduce the number of connection pipes on the established connection.

* * * * *